(12) United States Patent
Nakano et al.

(10) Patent No.: US 8,816,587 B2
(45) Date of Patent: Aug. 26, 2014

(54) ILLUMINANT DEVICE WITH ENHANCED HEAT DISSIPATION ABILITY

(75) Inventors: Takahiro Nakano, Kariya (JP); Tsutomu Kamizono, Nagoya (JP); Takahito Nishii, Nagoya (JP); Daisuke Nishitani, Kariya (JP); Yasutoshi Horii, Nagoya (JP)

(73) Assignee: Denso Corporation, Kariya (JP)

( * ) Notice: Subject to any disclaimer, the term of this patent is extended or adjusted under 35 U.S.C. 154(b) by 489 days.

(21) Appl. No.: 13/134,774

(22) Filed: Jun. 16, 2011

(65) Prior Publication Data

US 2011/0309750 A1 Dec. 22, 2011

(30) Foreign Application Priority Data

Jun. 17, 2010 (JP) ................................ 2010-138434

(51) Int. Cl.
*H01J 7/24* (2006.01)
(52) U.S. Cl.
USPC ........................................................... 315/112
(58) Field of Classification Search
USPC ................................................. 315/112, 118
See application file for complete search history.

(56) References Cited

U.S. PATENT DOCUMENTS

| | | | | |
|---|---|---|---|---|
| 5,343,359 A | * | 8/1994 | Morton et al. | 361/707 |
| 5,353,191 A | * | 10/1994 | Volz et al. | 361/690 |
| 8,120,268 B2 | * | 2/2012 | Spartano et al. | 315/246 |
| 8,207,693 B2 | * | 6/2012 | Hauser et al. | 318/34 |
| 8,406,007 B1 | * | 3/2013 | Folker et al. | 361/784 |
| 2007/0091577 A1 | | 4/2007 | Maehara | |
| 2007/0285918 A1 | * | 12/2007 | Sloan et al. | 362/231 |
| 2009/0189548 A1 | * | 7/2009 | Hoffman et al. | 315/307 |
| 2010/0254122 A1 | * | 10/2010 | Bayat et al. | 362/187 |
| 2012/0133205 A1 | * | 5/2012 | Adams et al. | 307/29 |
| 2012/0265390 A1 | * | 10/2012 | Hauser et al. | 701/22 |

FOREIGN PATENT DOCUMENTS

| | | |
|---|---|---|
| JP | H05-087982 | 11/1993 |
| JP | 09-282927 | 10/1997 |
| JP | 2000-195331 | 7/2000 |
| JP | 2000-244088 | 9/2000 |
| JP | 2007-115097 | 5/2007 |
| JP | 2007-317968 | 12/2007 |

OTHER PUBLICATIONS

Office action dated Apr. 24, 2012 in corresponding Japanese Application No. 2010-138434.

* cited by examiner

*Primary Examiner* — Thienvu Tran
(74) *Attorney, Agent, or Firm* — Harness, Dickey & Pierce, P.L.C.

(57) ABSTRACT

An illuminant device designed to activate a light source selectively in a plurality of lighting modes. The illuminant device includes a plurality of circuit boards having thermal conductivity and a plurality of lighting circuits each of which is operable to activate the light source in a selected one of the lighting modes. The lighting circuits are mounted on the circuit boards so that when the light source is being activated, the circuit boards will be different in temperature thereof from each other due to heat generated in at least one of the lighting circuits which is activating the light source. The illuminant device also includes a connector which couples the lighting boards together to transfer the heat therebetween, thereby enhancing the dissipation of the heat.

15 Claims, 4 Drawing Sheets

ILLUMINANT DEVICE WITH ENHANCED HEAT DISSIPATION ABILITY

CROSS REFERENCE TO RELATED DOCUMENT

The present application claims the benefit of priority of Japanese Patent Application No. 2010-138434 filed on Jun. 17, 2010, the disclosure of which is incorporated herein by reference.

BACKGROUND OF THE INVENTION

1. Technical Field

The present invention relates generally to an illuminant device such as a headlamp which may be employed in automotive vehicles, and more particularly to an illuminant device designed to improve the dissipation of heat, as generated by circuit components during operation.

2. Background Art

A plurality of lighting modes are known between which an operation of lamps used as illuminants for given areas is switched as needed. For instance, headlamps installed in automotive vehicles are usually switched between a low beam mode in which a beam of light is emitted to a short range area and a high beam mode in which a beam of light is emitted to a long range area. Lighting systems such as night vision or night view (trade mark) systems are also known which operate in an IR (infrared) mode to emit infrared light in order to increase a vehicle driver's perception and seeing distance in darkness or poor weather. Further, lighting systems are known which are used in mobile objects such as automotive vehicles and operate in a DRL (Daytime Running Lamps) mode to turn on an illuminant in a daytime or in a position mode to turn on the illuminant in order to improve an operator's perception of the width of the mobile object.

Most mobile objects such as automotive vehicles are usually subject to limitations on locations or spaces where lamps or lighting control devices are to be installed. It is, thus, necessary to decrease the size of the lamps or the lighting control devices. The downsizing of the lighting devices is achieved by fabricating a plurality of lighting circuits for the respective lighting modes on a single circuit board.

The integration of the lighting circuits on the single circuit board will result in an increased density at which the lighting circuits are located, which leads to a decreased area of the circuit board required to dissipate heat produced by the lighting circuits. This causes the heat to be accumulated in the circuit board, thus resulting in an elevation in temperature of parts of the lighting control device and a failure in lighting the lamp. In order to alleviate such a problem, Japanese Patent First Publication No. 2000-195331 teaches installation of a heat radiator such as a heat sink on the circuit board to release the heat outside the circuit board.

The installation of the heat radiator, however, will consume an area of the circuit board, thus obstructing the downsizing of the lighting control devices and also result in increases in weight and production cost of the lighting control devices.

Additionally, production of the lighting control devices which are different in combination of the lighting modes from each other requires preparation of a plurality of circuit boards on each of which lighting circuits for one of the different combinations of the lighting modes are fabricated, which will also result in increases in type and manufacturing cost of the circuit boards.

SUMMARY

It is therefore an object to provide an improved structure of an illuminant device designed to activate a light source selectively in a plurality of lighting modes, have an improved ability of heat dissipation, and/or permit the size, weight, and production costs to be reduced.

According to an embodiment, there is provided an illuminant device such as a headlamp for use in automotive vehicles. The illuminant device comprises: (a) a light source which is to be activated selectively in a plurality of lighting modes; (b) a plurality of circuit boards having thermal conductivity; (c) a plurality of lighting circuits each of which is operable to activate the light source in a selected one of the lighting modes, the lighting circuits being mounted on the circuit boards so that when the light source is activated, the circuit boards are different in temperature thereof from each other due to heat generated in at least one of the lighting circuits which is activating the light source; and (d) a connector which thermally connects the circuit boards together to transfer the heat therebetween.

When it is required to activate the light source in a selected one of the lighting modes, a corresponding one of the lighting circuits is supplied with electric power from the power supply. The lighting circuit supplied with the electric power will generate heat. The heat is transmitted to and spread over the circuit board, thereby resulting in an elevation in temperature thereof. The circuit board exhibits thermal conductivity (i.e., the heat dissipation ability) and thus serves as a heat radiator, thereby dissipating at least a portion of the heat to the outside.

When the light source is being activated, the circuit boards will be different in temperature thereof. This will cause a remaining amount of the heat to be transferred from the circuit board which has been elevated in temperature to the lower temperature circuit board(s) through the connector. The remaining amount of the heat is then dissipated to the outside. In other words, the circuit board(s) to which the heat has been transmitted serves as a heat radiator. This eliminates the need for an additional heat radiator such as a heat sink in the illuminant device, thus permitting the size, weight, and/or production cost of the illuminant device to be reduced.

The circuit boards have the lighting circuits mounted thereon, respectively. This results in a decrease in number of circuits needed to be fabricated on one of the circuit boards as compared with the case where a plurality of circuits are mounted on each of the circuit boards, in other words, a decrease in combination of the circuits to be fabricated on each of the circuit boards, which leads to a decrease in part number used to manage the circuit boards for making the illuminant device.

Some of the lighting circuits which are used to activate the lighting modes simultaneously may be mounted on the circuit boards, respectively. This ensures the stability in differentiating the temperature between the circuit boards. Specifically, when the electric power is supplied to the one of the circuit boards, no electric power is supplied to the other circuit boards. The one of the circuit boards is, therefore, elevated in temperature by the heat generated by the activation of the lighting circuit thereof, while the other circuit boards are kept in temperature. This results in a difference in temperature between the one of the circuit boards and the other circuit boards, thus causing a portion of the heat to be transmitted from the one of the circuit boards to the others. The other circuit boards function as the heat radiators to radiate the portion of the heat.

For example, some of the lighting modes which are to be activated simultaneously are the ones which are prohibited by legal regulations from being used simultaneously. Alternatively, there are the lighting modes which are to be used in daytime and nighttime, respectively, to emit visible light and invisible light, respectively, or physically infeasible to be used simultaneously, that is, used to activate a single light source.

The connector which thermally connects the circuit boards may also be designed to couple them electrically, thus eliminating the need for an additional electric connector and resulting in a decrease in parts making up the illuminant device. This permits the size, weight, or production costs of the illuminant device to be reduced.

In the case where components such as electronic devices of the lighting circuits may be broken down into a common operation group used to perform operations common to the lighting circuits and separate operation groups used to perform operations separately in the lighting circuits, at least one of the circuit boards may be designed to have the common operation group and one of the separate operation groups mounted thereon, while the other circuit boards may also be designed to have mounted thereon only the other separate operation groups which are coupled electrically with the common operation group through the connector. Such arrangements of the components permit an area on each of the circuit boards which is required to mount only the separate operation group to be decreased, thus allowing the overall size of the illuminant device to be reduced. The common operation group may be made up of the components used to supply the electric power to the light source or protect the light source from physical or electrical breakage.

According to another aspect of an embodiment, there is provided an illuminant device which comprises: (a) a light source which is to be activated selectively in a plurality of lighting modes; (b) a plurality of circuit boards having thermal conductivity; (c) a plurality of lighting circuits each of which is operable to activate the light source in a selected one of the lighting modes, the lighting circuits being mounted on selected ones of the circuit boards so that when the light source is being activated, the circuit boards are different in temperature thereof from each other due to heat generated in at least one of the lighting circuits which is activating the light source; (d) at least one dummy circuit board having thermal conductivity; and (e) a connector which thermally connects the circuit boards and the dummy circuit board to transfer the heat therebetween.

Specifically, the dummy circuit board has no electric components mounted thereon, so that no heat is generated, which will result in a difference in temperature between itself and the other circuit boards. The dummy circuit board, therefore, serves as a heat radiator form which the heat, as transmitted from the other circuit boards, is dissipated.

Each of the circuit boards may be made of one of a ceramic substrate and a metal-based substrate that is a metallic plate exhibiting thermal conductivity.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
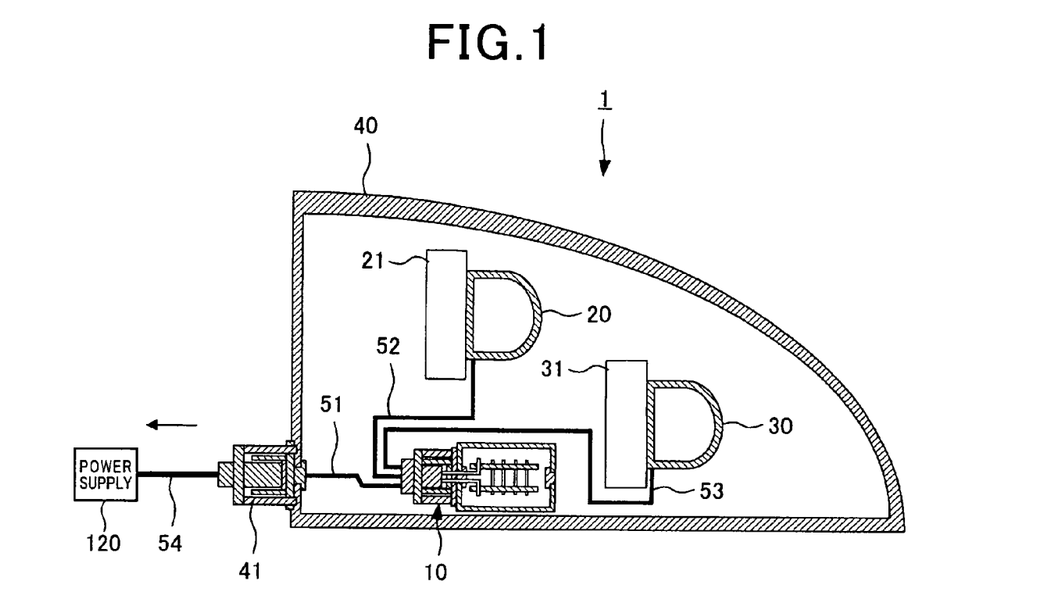
FIG. 1 is a cross sectional view which illustrates an illuminant device exemplified as an automotive headlamp according to the first embodiment.
Figure 2:
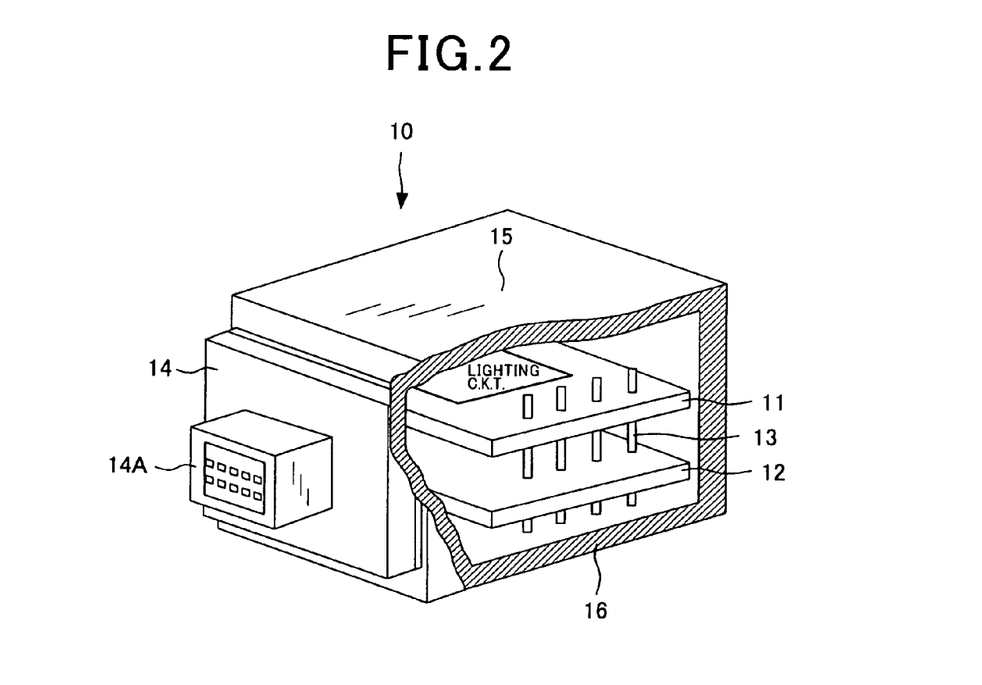
FIG. 2 is a partially sectional perspective view which illustrates a lighting control device installed in the illuminant device of FIG. 1.

Referring to the drawings, wherein like reference numbers refer to like parts in several views, particularly to FIG. 1, there is shown an illuminant device 1 according to the first embodiment. The illuminant device 1, as referred to herein, is designed as a headlamp for automotive vehicles. FIG. 2 shows a lighting control device 10 which controls the lighting of the headlamp 1.

The headlamp 1 is engineered to operate selectively in a plurality of lighting modes such as the low beam mode, the high beam mode, the IR mode, the position mode, and the DRL mode. The headlamp 1 will be described below as being operable selectively in the low beam mode, the DRL mode, and the position mode. The headlamp 1 is usually attached to each of the right and left sides of the front of a vehicle. The headlamp 1 is, as clearly illustrated in FIG. 1, equipped with the lighting control device 10, a first light source 20, a second light source 30, and a headlamp casing 40.

Figure 3:
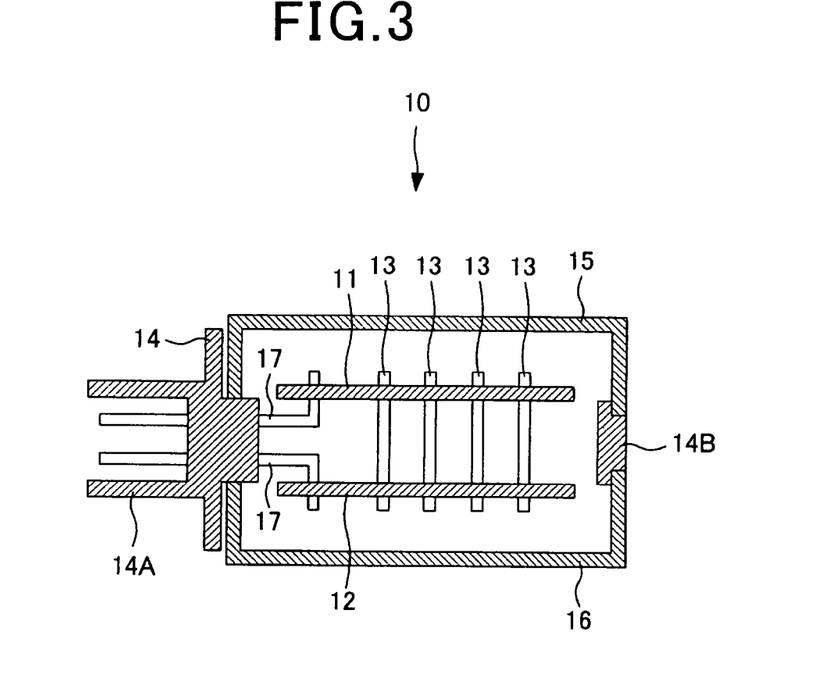
FIG. 3 is a longitudinal cross sectional view which shows an internal structure of the lighting control device of FIG. 2.
Figure 4:
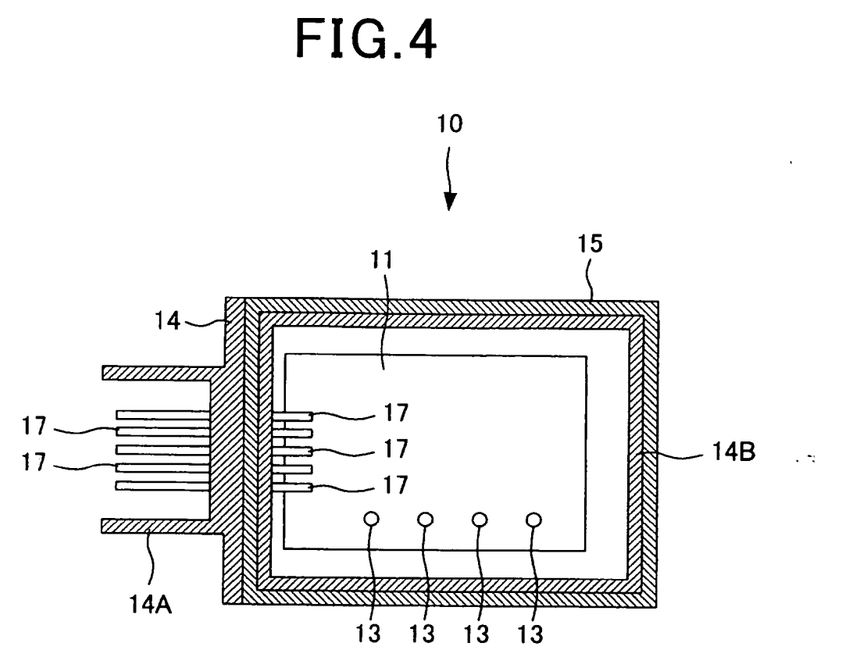
FIG. 4 is a top cross sectional view which shows an internal structure of the lighting control device of FIG. 2.

FIG. 3 is a cross sectional side view which illustrates an internal structure of the lighting control device 10. FIG. 4 is a cross sectional top view of the lighting control device 10.

The lighting control device 10 is responsive to a manual operation of the vehicle's driver to turn on or off the first and second light sources 20 and 30 to achieve a selected one of the lighting modes. The lighting control device 10 is, as illustrated in FIGS. 2 to 4, equipped with a first circuit board 11, a second circuit board 12, connectors 13, a resinous frame 14, a first metallic cover 15, and a second metallic cover 16.

The lighting control device 10, as referred to herein, is mounted within the headlamp 1 to control only its operation, but may alternatively be used as a common controller serving to control operations of a plurality of headlamps.

The first circuit board 11 has fabricated thereon a lighting circuit which controls turning on or off of the first light source 20. Specifically, the first circuit board 11 is equipped with a first driver (i.e., a lighting circuit) which works to control a supply of electric power to the first light source 20 to establish the DRL mode and the position mode selectively. Similarly, the second circuit board 12 has mounted thereon a second driver (i.e., a lighting circuit) which turns on or off the second light source 30 and control a supply of electric power to the second light source 30 to establish the low beam mode. Each of the first and second drivers consists of a plurality of components, i.e., electronic devices which achieve each of the lighting modes and wires joining them. FIG. 2 shows only one lighting circuit (i.e., the first driver) for the simplicity of illustration.

Each of the first and second circuit boards 11 and 12 is made of an alumina ceramic substrate, e.g., an alumina laminated substrate and has the electronic devices mounted on the surface of the substrate and the wires extending on and inside the substrate. The first and second circuit boards 11 and 12 are disposed within the lighting control device 10 and have major surfaces facing each other through an air gap. In other words, the first and second circuit boards 11 and 12 extend substantially parallel to each other.

Each of the first and second circuit boards 11 and 12 may alternatively be made of an aluminum-based substrate or other similar material. The aluminum-based substrate is an aluminum metallic plate on which a resinous insulating layer and a conductive circuit (i.e., a corresponding one of the first and second drivers) are formed.

The connectors 13 connect electrically between the circuits including the first and second drivers of the first and second circuit boards 11 and 12 to establish transmission of electric signals therebetween. The connectors 13 also serve to achieve transmission of heat between the first and second circuit boards 11 and 12.

Each of the connectors 13 is of a circular cylinder which is made from, for example, as aluminum, copper, or brass typically used as material of electric wire and extends straight. Each of the connectors 13, as can be seen in FIG. 3, extends through the first and second circuit board 11 and 12 and is fixed directly thereto or indirectly through a heat conductive member for achieving the conduction of heat between itself and the first and second circuit boards 11 and 12. Each of the connectors 13 is also joined electrically directly to the wires of the circuits mounted on the first and second circuit boards 11 and 12 or electrically indirectly through an electrical conductive member. Each of the connectors 13 may alternatively be designed as being of a plate shape or other shape.

The resinous frame 14, the first metallic cover 15, and the second metallic cover 16 define an outer shell or housing of the lighting control device 10 with an inner chamber in which the first and second circuit boards 11 and 12 are disposed.

The resinous frame 14 has formed thereon an electric connector 14A which is made of resin and designed as a socket to make electric connections with an internal power supply line 51 leading to a power supply 120 such as a storage battery mounted in the vehicle and first and second drive lines 52 and 53 which supply electric power to the first and second light sources 20 and 30. The connector 14A has installed therein conductors or pins 17 which establish electric connections among the first and second circuit boards 11 and 12, the internal power supply line 51, and the first and second drive lines 52 and 53. The resinous frame 14 also has, as illustrated in FIGS. 3 and 4, formed integrally thereon a hollow housing frame 14B. The hollow housing frame 14B is of a square or rectangular shape. The housing frame 14B has the connector 14A formed on one of four side walls thereof and is exposed at an inner wall thereof to the inner chamber in which the first and second circuit boards 11 and 12 and the connectors 13 are disposed.

Each of the first and second metallic covers 15 and 16 is formed by a hollow square cylinder or box with an open end and a closed end (i.e., a bottom). Each of the first and second metallic covers 15 and 16 is made of a thermal conductive material such as aluminum. The first and second metallic covers 15 and 16 are joined at the open ends thereof to each other through the housing frame 14B. In other words, the housing frame 14B serves as a retainer to join the first and second circuit boards 11 and 12 firmly to define the housing of the lighting control device 10.

The housing, as formed by the resinous frame 14, the first metallic cover 15, and the second metallic cover 16, may be filled with a thermal conductive material such as silicon gel. It is advisable that the thermal conductive material be disposed inside the housing in thermal connection between at least one of the first and second circuit boards 11 and 12 and one of the first and second metallic covers 15 and 16.

The first light source 20 is activated or lighted in each of the DRL mode and the position mode. In other words, the first light source 20 is shared as a lamp (also called a side marker lamp, a width indicator, or a small lamp) used both in the DRL mode and in the position mode. The second light source 30 is activated or lighten in the low beam mode. The first and second light sources 20 and 30 are equipped with heat radiators 21 and 31 from which heat, as arising from the lighting of the first and second light sources 20 and 30, is to be dissipated. The first and second light sources 20 and 30 may be implemented by known illuminants or lamps typically used in automotive vehicles.

The headlamp 1 also includes a headlamp housing 40 in which the lighting control device 10, the first light source 20, and the second light source 30 are disposed. The headlamp housing 40 has the headlamp connector 41 jointed to a side wall thereof. The headlamp connector 41 electrically connects between the internal power supply line 51 extending inside the headlamp housing 40 and the external power supply line 54 leading to the leading to the power supply 120 such as the battery mounted in the vehicle.

The lighting operation of the headlamp 1 and the heat dissipation from the lighting control device 10 will be discussed below with reference to FIGS. 1 to 4. The following discussion will refer to an example where the headlamp 1 is turned on in the DRL mode.

When the vehicle's operator performs an operation for activating the headlamp 1 in the DRL mode, a DRL mode signal is inputted to the lighting control device 10. The first driver on the first circuit board 11 then converts the electric current, as supplied from the power supply 120 through the external power supply line 54, the headlamp connector 41, the internal power supply line 51, and the pins 17, into a drive current to turn on the first light source 20 in the DRL mode. The drive current is delivered from the first driver to the first light source 20 through the first drive line 52. The first light source 20 is then turned on in the DRL mode.

When the first light source 20 is in the DRL mode, no current is supplied to the second driver of the second circuit board 12, so that it is at rest. The driver current is, therefore, not delivered from the second circuit board 12 to the second light source 30.

Subsequently, when the vehicle's operator switches the DRL mode to the low beam mode, the supply of current from the first circuit board 11 to the first light source 20 is stopped, while the drive current is delivered from the second driver of the second circuit board 12 to the second light source 30 through the second drive line 53. The second light source 30 is then turned on and lighted in the low beam mode.

Alternatively, when the vehicle's operator switches the DRL mode to the position mode, the driver current supplied from the first circuit board 11 to the first light source 20 to achieve the DRL mode is changed into that required to light the first light source 20 in the position mode. The first light source 20 then operates on such a changed drive current in the position mode.

When the headlamp 1 is operating in the DRL mode, the first driver of the first circuit board 11, as described above, continues to convert the current, as fed from the power supply 120 such as the battery, into the drive current for the first light source 20. This will cause the electronic devices of the first driver to develop heat which in turn spreads over the whole of the first driver through the wires. The heat is also transmitted to the first circuit board 11, so that the temperature of the first circuit board 11 will rise. The part of the heat of the first circuit board 11 is radiated to a medium (e.g., air or the silicon gel) lying around the first circuit board 11 and then transferred to the first metallic cover 15 and the second metallic cover 16. The heat is finally dissipated out of the lighting control device 10 from the first and second metallic covers 15 and 16.

In the DRL mode, no current is supplied to the second driver of the second circuit board 12, so that the temperature of the second circuit board 12 does not rise, thus resulting in a difference in temperature between the first circuit board 11 and the second circuit board 12. The connectors 13, as described above, join between the first and second circuit boards 11 and 12 so that the heat will transfer therebetween. The temperature gradient is, thus, created in each of the connectors 13, thus causing heat to transfer from the higher temperature first circuit board 11 to the lower temperature second circuit board 12. The part of the heat which has not been dissipated directly from the first circuit board 11 is, therefore, transmitted to the second circuit board 12 through the connectors 13.

The heat transmitted to the second circuit board 12 is, like in the first circuit board 11, radiated to a medium (e.g., air or the silicon gel) lying around the second circuit board 12 and then transferred to the first metallic cover 15 and the second metallic cover 16.

The low beam mode and the position mode which are mainly used at night are sometimes activated simultaneously. The amount of heat, as produced by the first driver of the first circuit board 11 which achieves the position mode, is usually smaller than that produced by the second driver of the second circuit board 12 which achieves the low beam mode because the electric power consumed by the first driver is smaller, thus resulting in a difference in temperature between the first and second circuit boards 11 and 12. This will cause the part of heat of the higher temperature second circuit board 12 to be dissipated to the outside through the lower temperature first circuit board 11.

As apparent from the above discussion, the structure of the lighting control device 10 is so designed that the connectors 13 server to transfer thermal energy from one of the first and second circuit boards 11 and 12 which is higher in temperature to the other, so that the heat will be radiated from both the first and second circuit boards 11 and 12. In other words, when, for example, the first circuit board 11 is higher in temperature than the second circuit board 12, the second circuit board 12 works as a radiator plate or heat sink to enhance the dissipation of heat produced by the first circuit board 11. This eliminates the need for an additional heat radiator in the lighting control device 10, thus permitting the overall size or weight of the lamp 1 to be decreased.

The first and second drivers are disposed on the first and second circuit boards 11 and 12, respectively. This results in a decrease in electronic devices needed to be fabricated on each of the first and second circuit boards 11 and 12 as compared with the case where all required electronic devices are integrated in a single circuit board, in other words, a decrease in combination of electronic devices to be fabricated on each of the first and second circuit boards 11 and 12, which leads to a decrease in part number used to manage circuit boards for making the lighting control device 10.

The connectors 13, as described above, serve to couple the first and second circuit boards 11 and 12 together thermally and also connect the first and second drivers electrically, thus eliminating the need for discrete members exhibiting such two features and permitting the size and production costs of the lighting control device 10 (i.e., the lamp 1) to be decreased.

The first light source 20 is activated selectively in the DRL mode and the position mode by the first driver of the first circuit board 11, however, the lamp 1 may alternatively be designed to achieve the DRL mode and the position mode through the first driver and the second driver, respectively, or include an additional lighting circuit (i.e., a driver) for either of the DRL mode and the position mode.

The second light source 30 is activated in the low beam mode by the second driver of the second circuit board 12, however, may also be designed to achieve the high beam mode and/or the IR mode.

The lamp 1 may also be designed to have three or more circuit boards which have fabricated thereon lighting circuits to activate three or more light sources to establish a plurality of lighting modes selectively.

A combination of the lighting modes to be undertaken by each of the first and second circuit boards 11 and 12 is preferably selected according to legal regulations in a country where the headlamp 1 is used. For example, the first and second drivers mounted on the first and second circuit boards 11 and 12 are preferably located such that drivers controlling mutually-exclusive lighting modes (as defined by national traffic regulations) are not located on the same circuit board. Additionally, the first and second drivers of the first and second circuit boards 11 and 12 are preferably located such that drivers controlling mutually-exclusive lighting modes such as daytime and nighttime modes are not located on the same circuit. The first and second drivers of the first and second circuit boards 11 and 12 are preferably located such that drivers controlling the lighting modes for emitting visible light and invisible light are not located on the same circuit board. Moreover, the first and second drivers of the first and second circuit boards 11 and 12 are preferably located such that drivers for lighting modes that are physically infeasible for simultaneous use (such as those for the first and second light sources 20 and 30) are not located on the same circuit board.

Figure 5:
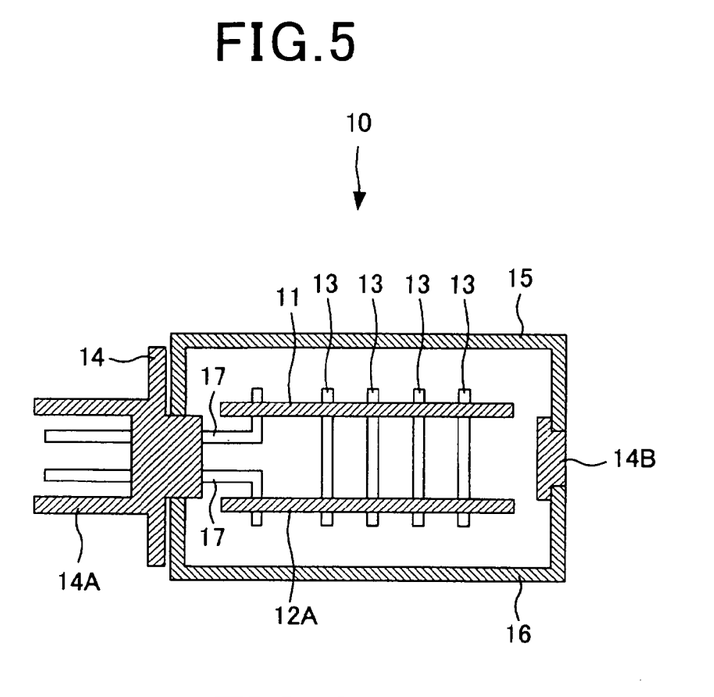
FIG. 5 is a longitudinal cross sectional view of a modified form of the lighting control device of FIG. 2.

FIG. 5 illustrates a modification of the lighting control device 10. The same reference numbers as employed in FIGS. 1 to 4 will refer to the same parts, and explanation thereof in detail will be omitted here.

The lighting control device 10 is equipped with a second circuit board 12A on which no electronic devices are fabricated. All electronic devices required to achieve the lighting modes are mounted on the first circuit board 11. The second circuit board 12A is used as a dummy circuit board, in other words, only as a heat radiator from which heat generated by the first circuit board 11 is dissipated.

In the case where it is possible to classify the electronic devices of the first and second drivers of the first and second circuit boards 11 and 12 into a common operation group used to perform operations common to the first and second drivers and separate operation groups used to perform operations separately in the first and second drivers, the common operation group and one of the separate operation groups may be mounted on one of the first and second circuit boards 11 and 12, while the other of the separate operation groups may be mounted on the other of the first and second circuit boards 11 and 12. In this case, the second driver may use the common operation group of electronic devices of the first driver to activate the second-light source 20. Such arrangements of the electronic devices permit an area on the second circuit board 12 required to mount the second driver to be decreased, thus allowing the overall size of the lamp 1 to be reduced. The common operation group may be made up of the electronic devices used to supply the electric power to the first and second light sources 20 and 30 or protect the first and second light sources 20 and 30 from physical or electrical breakage.

Figure 6:
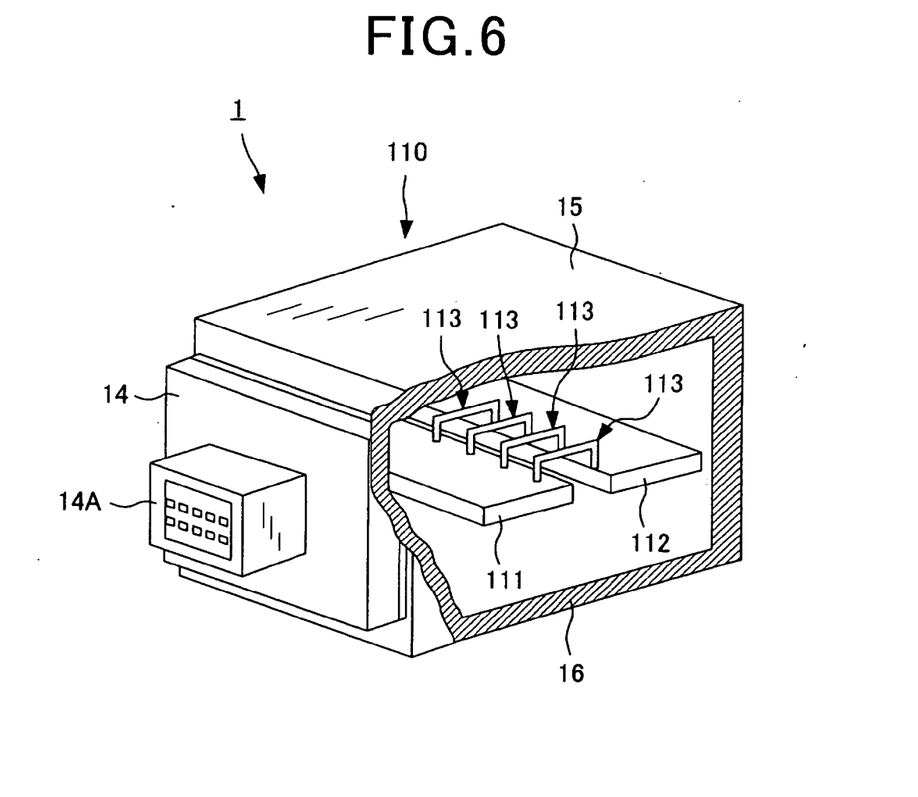
FIG. 6 is a partially sectional perspective view which illustrates a lighting control device according to the second embodiment.
Figure 7:
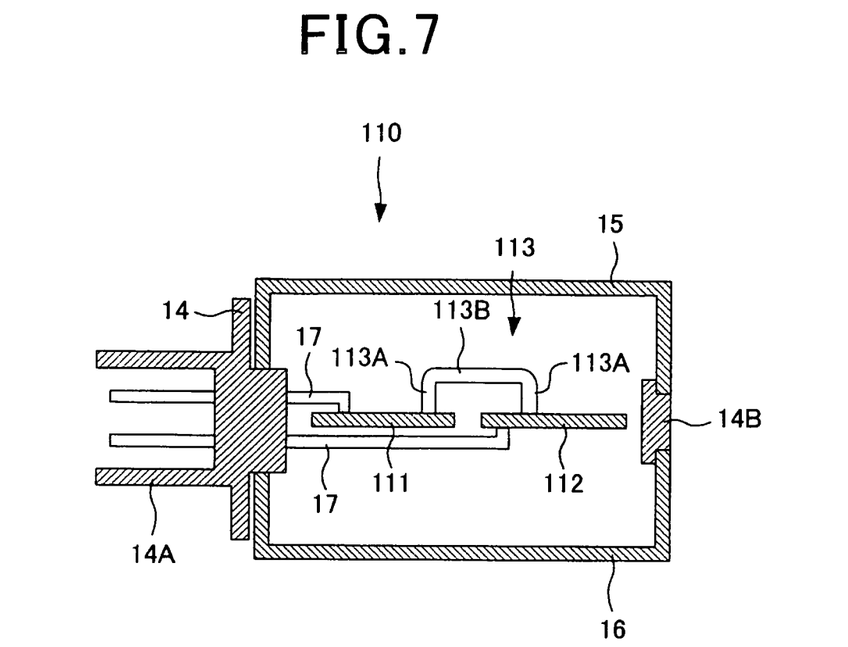
FIG. 7 is a longitudinal cross sectional view which shows an internal structure of the lighting control device of FIG. 6.
Figure 8:
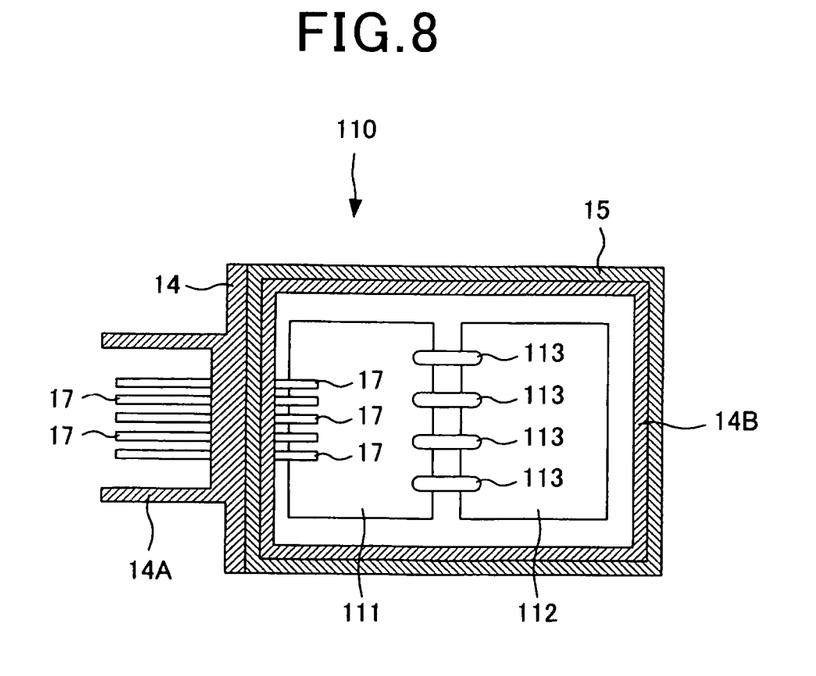
FIG. 8 is a top cross sectional view which shows an internal structure of the lighting control device of FIG. 6.

FIGS. 6 to 8 illustrate a lighting control device 110 according to the second embodiment. The same reference numbers as employed in the first embodiment will refer to the same parts, and explanation thereof in detail will be omitted here.

The lighting control device 110 consists essentially of a first circuit board 111, a second circuit board 112, connectors 113, a resinous frame 14, a first metallic cover 15, and a second metallic cover 16.

The first and second circuit boards 111 and 112 are, as can be seen from the drawings, arrayed at an interval away from each other and lie flush with each other horizontally. The first and second circuit boards 111 and 112 are identical in material with the first and second circuit boards 11 and 12 of the first embodiment and have mounted on the same drivers as those of the first and second circuit boards 11 and 12.

Each of the connectors 113 is, as clearly illustrated in FIGS. 6 to 8, of substantially a C-shape and extends between the first and second circuit boards 111 and 112. Specifically, each of the connectors 113 is, as illustrated in FIG. 7, made up of upright sections 113A extending in a direction traversing (e.g., at right angles to) major surfaces of the first and second circuit boards 111 and 112 and a horizontal section (will also be referred to as beam) 113B connecting between ends of the upright sections 113A. The material making the connectors 113 and electronic devices the connectors 113 couple together are the same as those in the first embodiment. Other arrangements of the lighting control device 110 are identical with those of the lighting control device 10 of the first embodiment, and explanation thereof in detail will be omitted here.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The illuminant device 1 may be designed to activate three or more lighting sources and equipped with three or more circuit boards each of which has a light source driving circuit (i.e., a driver) or one or some of which are used as dummy circuit boards serving as heat radiators.

The illuminant device 1 has been described above as the headlamp of an automobile, however, it may be designed for other mobile objects.

What is claimed is:

1. An illuminant device comprising:
a light source which is to be activated selectively in a plurality of lighting modes;
a plurality of circuit boards having thermal conductivity;
a plurality of lighting circuits each of which is operable to activate the light source in a selected one of the lighting modes, the lighting circuits working to implement the lighting modes which are prohibited from being used simultaneously, each of the lighting circuits being mounted on a respective circuit board so that when the light source is activated, heat is transferred from the circuit board and lighting circuit which is activating the light source to at least one of the circuit boards and lighting circuits; and
a connector which thermally connects the circuit boards together to transfer the heat therebetween.

2. An illuminant device as set forth in claim 1, wherein the lighting modes which are prohibited from being used simultaneously are are prohibited from being used simultaneously by legal regulations.

3. An illuminant device as set forth in claim 1, wherein the lighting circuits which implement the lighting modes which are to be used in daytime and nighttime are mounted on the different circuit boards, respectively.

4. An illuminant device as set forth in claim 1, wherein the lighting circuits which implement the lighting modes which are to emit visible light and invisible light are mounted on the different circuit boards, respectively.

5. An illuminant device as set forth in claim 1, wherein the connector electrically connects between the lighting circuits.

6. An illuminant device as set forth in claim 2, wherein components of the lighting circuits are broken down into a common operation group used to perform operations common to the lighting circuits and separate operation groups used to perform operations separately in the lighting circuits, and wherein at least one of the circuit boards has the common operation group and one of the separate operation groups mounted thereon, while the other circuit boards have mounted thereon only the other separate operation groups which are coupled electrically with the common operation group through the connector.

7. An illuminant device as set forth in claim 1, wherein each of the circuit boards is made of one of a ceramic substrate and a metal-based substrate that is a metallic plate on which a corresponding one of the lighting circuits is mounted.

8. An illuminant device as set forth in claim 1, wherein the light source emits light when activated by electric power fed from a power supply.

9. An illuminant device comprising:
a light source which is to be activated selectively in a plurality of lighting modes;
a plurality of circuit boards having thermal conductivity;
a plurality of lighting circuits each of which is operable to activate the light source in a selected one of the lighting modes, the lighting circuits working to implement the lighting modes which are prohibited from being used simultaneously, each of the lighting circuits being mounted on a respective circuit board so that when the light source is activated, heat is transferred from the circuit board and lighting circuit which is activating the light source to at least one of the circuit boards and lighting circuits;
at least one dummy circuit board having thermal conductivity; and
a connector which thermally connects the circuit boards and the dummy circuit board to transfer the heat therebetween.

10. An illuminant device as set forth in claim 9, wherein each of the circuit boards is made of one of a ceramic substrate and a metal-based substrate that is a metallic plate on which a corresponding one of the lighting circuits is mounted.

11. An illuminant device as set forth in claim 9, wherein the light source emits light when activated by electric power fed from a power supply.

12. An illuminant device as set forth in claim 9, wherein the at least one other of the circuit boards and lighting circuits defines a heat sink for the circuit board and lighting circuit activating the light source.

13. An illuminant device as set forth in claim 1, wherein the at least one other of the circuit boards and lighting circuits defines a heat sink for the circuit board and lighting circuit activating the light source.

14. An illuminant device comprising:
a first light source which is to be activated in a first lighting mode;
a second light source which is to be activated in a second lighting mode;
a first circuit board having thermal conductivity;
a first lighting circuit mounted on the first circuit board, the first lighting circuit operable to activate the first light source in the first mode;
a second circuit board having thermal conductivity;
a second lighting circuit mounted on the second circuit board, the second lighting circuit operable to activate the second light source in the second mode; and
a connector thermally connecting the first and second circuit boards, heat being transferred between the first and second circuit boards by the connector; wherein
the first and second lighting modes are prohibited from being activated simultaneously;
the second circuit board defines a heat sink for the first circuit board when the first lighting mode is activated; and
the first circuit board defines a heat sink for the second circuit board when the second lighting mode is activated.

15. An illuminant device as set forth in claim 14, wherein the first and second light sources are prohibited from being activated simultaneously.

\* \* \* \* \*